United States Patent
Panje et al.

(10) Patent No.: US 11,606,792 B2
(45) Date of Patent: Mar. 14, 2023

(54) WI-FI ACCESS POINT FOR ENHANCING SSID AVAILABILITY WITH SMART CHANNEL SELECTION

(71) Applicant: ARRIS Enterprises LLC, Suwanee, GA (US)

(72) Inventors: Krishna Prasad Panje, Bengaluru (IN); Lakshmi Arunkumar, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 126 days.

(21) Appl. No.: 17/332,000

(22) Filed: May 27, 2021

(65) Prior Publication Data

US 2022/0007366 A1  Jan. 6, 2022

Related U.S. Application Data

(60) Provisional application No. 63/048,384, filed on Jul. 6, 2020.

(51) Int. Cl.
| | |
|---|---|
| *H04L 12/28* | (2006.01) |
| *H04W 72/0453* | (2023.01) |
| *H04W 24/08* | (2009.01) |
| *H04J 1/16* | (2006.01) |
| *H04W 84/12* | (2009.01) |

(52) U.S. Cl.
CPC ....... *H04W 72/0453* (2013.01); *H04W 24/08* (2013.01); *H04W 84/12* (2013.01)

(58) Field of Classification Search
CPC .. H04B 17/345; H04J 11/0023; H04W 16/14; H04W 72/0453; H04W 72/082; H04W 84/12
USPC ................. 370/252, 329, 430, 442
See application file for complete search history.

(56) References Cited

U.S. PATENT DOCUMENTS

| | | | |
|---|---|---|---|
| 2017/0264487 A1* | 9/2017 | Scahill | ........... H04L 41/0816 |
| 2020/0288353 A1* | 9/2020 | Kulkarni | ........... H04W 28/20 |
| 2021/0409976 A1* | 12/2021 | Ergen | ........... H04W 72/0453 |

\* cited by examiner

*Primary Examiner* — John Pezzlo
(74) *Attorney, Agent, or Firm* — Wenderoth, Lind & Ponack, L.L.P.

(57) ABSTRACT

An electronic apparatus, method, and computer-readable medium implement smart channel selection to track client devices that connect with a LAN over time, store a historical number of client devices that connect with the LAN and a channel number on which the apparatus operated each connection with the client devices, and determine whether a number of probes/association requests on a current channel in the 5 GHz band on which the apparatus is operating is less than a predefined threshold value. When the number of probes/association requests on the current channel in the 5 GHz band on which the apparatus is operating is less than a predefined threshold value, smart channel selection is performed to select a new channel in the 5 GHz band, and the 5 GHz SSID of the apparatus is broadcasted on the new channel.

20 Claims, 9 Drawing Sheets

Channel Table 300

| Channels (5 GHz Band) | # of Client Devices | # of Probes/Association Requests | Above Threshold? | Quality | Smart Channel Selection Function |
|---|---|---|---|---|---|
| 32 |  |  |  |  | (Select "next best" quality channel above threshold and migrate?) |
| 36 |  |  |  |  |  |
| 38 |  |  |  |  |  |
| 40 |  |  |  |  |  |
| 42 |  |  |  |  |  |
| 44 |  |  |  |  |  |
| 46 |  |  |  |  |  |
| 48 |  |  |  |  |  |
| (DFS channels) |  |  |  |  | (Is current channel sub-optimal for some client devices to detect and connect?) |
| 149 |  |  |  |  |  |
| 151 |  |  |  |  |  |
| 153 |  |  |  |  |  |
| 155 |  |  |  |  |  |
| 157 |  |  |  |  |  |
| 159 |  |  |  |  |  |
| 161 |  |  |  |  |  |
| 165 |  |  |  |  |  |

*FIG. 8A*

| Channels (20 MHz wide) | # of Client Devices | # of Probes/Association Requests | Above Threshold? | Quality | Smart Channel Selection Function |
|---|---|---|---|---|---|
| 32 |  |  | N | 10 | (Select "next best" quality channel above threshold and migrate) |
| 36 |  |  | Y | 9 |  |
| 40 |  |  | Y | 8 |  |
| 44 |  |  | N | 7 |  |
| 48 |  |  | Y | 6 |  |
| (DFS channels) |  |  |  |  | (Current channel is sub-optimal for some client devices to detect and connect) |
| 149 |  |  | N | 5 |  |
| 153 |  |  | N | 1 |  |
| 157 |  |  | N | 4 |  |
| 161 |  |  | N | 2 |  |
| 165 |  |  | N | 3 |  |

| Channels (40 MHz wide) | # of Client Devices | # of Probes/Association Requests | Above Threshold? | Quality | Smart Channel Selection Function |
|---|---|---|---|---|---|
| 38 |  |  | Y | 3 | (Select "next best" channel above threshold and migrate) |
| 46 |  |  | N | 4 |  |
| (DFS channels) |  |  |  |  | (Current channel is sub-optimal for some client devices to detect and connect) |
| 151 |  |  | N | 1 |  |
| 159 |  |  | N | 2 |  |

| Channels (80 MHz wide) | # of Client Devices | # of Probes/Association Requests | Above Threshold? | Quality | Smart Channel Selection Function |
|---|---|---|---|---|---|
| 42 |  |  | Y | 2 | (Select "next best" quality channel above threshold and migrate) |
| (DFS channels) |  |  |  |  | (Current channel is sub-optimal for some client devices to detect and connect) |
| 155 |  |  | N | 1 |  |

*FIG. 8B*

WI-FI ACCESS POINT FOR ENHANCING SSID AVAILABILITY WITH SMART CHANNEL SELECTION

BACKGROUND

Companies are increasingly providing Multiple Access Point (MAP) architecture or Home Network Controller (HNC) type of home Wi-Fi management, with multiple access points (APs) within the home to improve Quality of Experience (QoE) of the user. Wireless APs communicate with client devices using one or more RF channels. Typically, Wi-Fi client devices discover APs by scanning and listening for beacons (passive scanning), or by sending out probes/association requests on a channel and finding any AP(s) available on that channel (active scanning).

In a case of the 2.4 GHz band, there are a total of 14 channels with only 3 of those channels being non-overlapping (e.g., channels 1, 6, and 11). Thus, the number of non-overlapping channels in the 2.4 GHz band are very limited, and may provide insufficient QoE to customers especially in denser deployments (e.g., corporate offices, high-rise apartment buildings, public venues, large homes, etc.). However, many modern client devices such as smartphones support using the 5 GHz band, and customers increasingly prefer to use the 5 GHz band because it offers wider channels, which may allow for higher bit rates as compared to the 2.4 GHz band.

In the case of the 5 GHz band, there are a substantially greater number of non-overlapping channels available for Wi-Fi use in comparison to the 2.4 GHz band. In a case of using 20 MHz wide channels, there are at least 24 non-overlapping channels (and optionally up to 28 non-overlapping channels in some instances). In a case of using 40 MHz wide channels, there are 12 non-overlapping channels. In a case of using 80 MHz wide channels, there are 6 non-overlapping channels. Channels in the 5 GHz band may have less interference from overlapping systems because there are more channels. However, if a given AP cannot support a Dynamic Frequency Selection (DFS) function, then the remaining non-DFS channels in the 5 GHz band are often still crowded with overlapping AP transmissions.

At startup, home network gateway devices and/or wireless APs are often configured to perform an auto-channel selection function. Many known gateways/access points (GWs/APs) according to the related art make channel selection decisions for client devices based on signal conditions, for example. The auto-channel selection function attempts to find the best channel for client devices to detect and connect considering conditions of the local network environment, such as received signal strength (RSSI), noise, signal-to-noise ratio (SNR), interference, channel utilization, the presence of any neighboring AP(s), and the like. Because there are a limited number of channels available for communication and because these channels may partially overlap in some cases, there may be interference between neighboring client devices and/or other electronic devices when such devices enter and leave the local environment. However, because the auto-channel selection function only operates at startup of the GW or AP and the conditions of the local environment may change over time, the pre-selected channel on which the GW or AP is currently operating may become sub-optimal as a result of the changing conditions.

Many customers often experience a problem that some of their client devices such as smartphones are not finding the 5 GHz service set identifier (SSID) of the AP. This typically happens because the auto-channel selection function of APs tends to select higher 5 GHz channel numbers (e.g., in the higher range of non-DFS channels 149 through 165), but many popular smartphones and other client devices typically do not operate on higher channels and instead these smartphones tend to select lower 5 GHz channel numbers (e.g., in the lower range of non-DFS channels 36 through 48). Thus, the smartphones and the APs may "miss" each other when the APs are transmitting beacons and/or listening for probes/association requests on the higher UNII-3 channels (channels 149-165) while the smartphones are listening for beacons and/or transmitting probes/association requests on the lower UNII-1 channels (channels 36-48). Also, the smartphones may be unable to use and/or the APs may be configured not to use the intermediate DFS channels (e.g., in the middle range of channels 52-68 and channels 96-144) in many Wi-Fi deployments.

Additionally or alternatively, the customer's smartphones may be unable to find the 5 GHz SSID of the AP due to channel interference. For example, the smartphone may not hear a beacon on a certain channel, and/or probes on said interfered-with channel may not reach the AP. This is also because the AP hardware (e.g., antennas, power supply) is more powerful in comparison to client station hardware, such that client devices may suffer more interference compared to the AP.

The above-described problem confounds the Multi-AP/HNC scenario where all APs advertise the same 5 GHz SSIDs, but some of the APs do not receive any probes from some client devices, nor do those client devices receive any beacons from those APs. Normally, the Non-associated client station probes received by the AP are forwarded to the controller (HNC) to aid in steering logic. However, this problem causes some of the APs within Multi-AP deployments to miss Non-associated client station probes, even though the Non-associated client station is within hearing distance of the AP, thus hampering the steering logic.

In these problematic cases where the customer's smartphone cannot find the 5 GHz SSID of the AP, the customer often calls customer support of the AP manufacturers. One typical solution given by the tech support is to remove the "auto" channel (e.g., disable the auto-channel selection function) on the AP and set a "fixed" channel instead. For example, the fixed channel is typically set at channel 36, which is usually the first 20 MHz wide channel in the 5 GHz band. However, it is also possible to use one of the other channels in the lower range of channels 32 to 48 as the fixed channel (e.g., a different channel other than channel 36 may be randomly selected from this range, or each of the channels in this range could be tried in sequence until establishing a connection). Regardless of whether channel 36 is selected by default or another one of the channels in the range from channels 32-48 is selected at random, this known solution does not consider or identify which one of these lower channels is actually the best available channel (e.g., optimal, ideal, fastest, strongest signal, low noise, least congested, least interference, etc.) based on historical and/or current network conditions. Thus, although this known solution addresses the problem of the customer's smartphone being unable to find the 5 GHz SSID of the AP, it deprives the AP of the opportunity to select a better channel than the fixed channel (e.g., channel 36) and/or to select the best available channel (e.g., from among channels 32 through 48) depending on historical and/or current network conditions.

Therefore, there is a need to provide improved electronic apparatuses (e.g., home network gateway (GW) devices, wireless access points (APs), Wi-Fi extenders, etc.) that are configured to perform a method to find the client device(s) (e.g., smartphones and the like) and also select an optimal or ideal 5 GHz channel for operation that is usable by all (or most) of the client devices within a particular WLAN environment (including any Non-associated client stations).

SUMMARY

According to aspects of the present disclosure there are provided novel solutions for enabling a network GW device and/or a wireless AP to operate on the "best" available channel (e.g., optimal, ideal, fastest, least congested, lowest interference, etc.) from among channels that are also considered "popular" with client devices in the WLAN environment. In addition, there is provided a "Find My Phone" feature on an application (e.g., a mobile app) associated with the GW and/or AP that may be provided by the Multiple System Operator (MSO) or Internet Service Provider (ISP), and which can make client devices (e.g., smartphones) list or "find" the 5 GHz SSID of the AP. The aspects of the present disclosure provide features that enhance SSID availability with a "Smart Channel Selection" function, and which may be incorporated into home/residential network gateway (GW) devices, wireless access points (Wi-Fi APs), Home Network Controller (HNC) devices, wireless routers, mesh networking nodes (e.g., Wi-Fi EasyMesh systems), and the like.

An aspect of the present disclosure provides an electronic apparatus for smart channel selection. The electronic apparatus includes a memory storing computer-readable instructions, and a processor configured to execute the computer-readable instructions to track client devices that connect with a local area network (LAN) of the electronic apparatus over time, store a historical number of client devices that connect with the LAN, and a channel number on which the electronic apparatus operated each connection with the client devices. The electronic device monitors a number of probes/association requests on channels in a 5 GHz radio frequency band that are available to broadcast a 5 GHz service set identifier (SSID) of the electronic apparatus, and determines whether the number of probes/association requests on a current channel in the 5 GHz radio frequency band on which the electronic apparatus is operating is less than a predefined threshold value. In response to the number of probes/association requests on the current channel being less than the predefined threshold value, the processor of the electronic apparatus is configured to execute the computer readable instructions to perform a smart channel selection function to select a new channel in the 5 GHz radio frequency band having a number of probes/association requests that is greater than or equal to the predefined threshold value, and broadcast the 5 GHz SSID of the electronic apparatus on the new channel that is selected based on the smart channel selection function.

In an aspect of the present disclosure, the processor of the electronic apparatus is further configured to execute the computer-readable instructions to generate a list of channels in the 5 GHz radio frequency band that are available for Wi-Fi use, wherein the list of channels includes a lower range of channels and an upper range of channels.

In an aspect of the present disclosure, the processor of the electronic apparatus is further configured to execute the computer-readable instructions to perform an auto-channel selection function at startup of the electronic apparatus to select a first channel from the list of channels, the first channel having a best quality among channels in the list of channels based on any of signal strength, noise, interference, channel utilization, or a combination thereof, and broadcast the 5 GHz SSID on the current channel, wherein the current channel is the first channel that is selected based on the auto-channel selection function.

In an aspect of the present disclosure, the lower range of channels includes U-NII-1 channels in the range of 5.15 GHz to 5.25 GHz, including: channels 32, 36, 40, 44, and 48 in a case of the electronic apparatus operating with 20 MHz wide channels, channels 38 and 46 in a case of the electronic apparatus operating with 40 MHz channels, and channel 42 in a case of the electronic apparatus operating with 80 MHz channels, and the upper range of channels includes U-NII-3 channels in the range of about 5.725-5.735 GHz to about 5.825-5.835 GHz, including: channels 149, 153, 157, 161, and 165 in the case of the electronic apparatus operating with 20 MHz wide channels, channels 151 and 159 in the case of the electronic apparatus operating with 40 MHz wide channels, and channel 155 in the case of the electronic apparatus operating with 80 MHz wide channels.

In an aspect of the present disclosure, the lower range of channels further includes U-NII-2A channels in the range of 5.25 GHz to 5.35 GHz, which are subject to dynamic frequency selection (DFS), including: channels 52, 56, 60, 64, and 68 in the case of 20 MHz wide channels, channels 54 and 62 in the case of 40 MHz wide channels, and channel 58 in the case of 80 MHz wide channels, and the upper range of channels further includes U-NII-2C channels in the range of 5.47 GHz to 5.725 GHz, which are subject to dynamic frequency selection (DFS), including: channels 96, 100, 104, 108, 112, 116, 120, 124, 128, 132, 136, 140, and 144 in the case of 20 MHz wide channels, channels 102, 110, 118, 126, 134, and 142 in the case of 40 MHz wide channels, and channel 114 in the case of 80 MHz wide channels.

In an aspect of the present disclosure, the list of channels excludes an intermediate range of channels in the 5 GHz radio frequency band that are subject to dynamic frequency selection (DFS), wherein the intermediate range of channels includes U-NII-2 channels in the range of 5.25 GHz to 5.725 GHz.

In an aspect of the present disclosure, the current channel that is selected from the list of channels based on the auto-channel selection function is a channel in the upper range of channels in the 5 GHz radio frequency band, and the new channel that is selected from the list of channels based on the smart channel selection function is a channel in the lower range of channels in the 5 GHz radio frequency band, wherein the new channel is a channel having a best quality among channels in the list of channels having a number of probes/association requests that is greater than the predefined threshold value.

In an aspect of the present disclosure, the processor of the electronic apparatus is further configured to execute the computer-readable instructions to establish a connection with one or more client devices that detect the 5 GHz SSID of the electronic apparatus on the new channel in the LAN.

In an aspect of the present disclosure, the processor of the electronic apparatus is further configured to execute the computer-readable instructions to determine whether any client devices connect on one of the current channel or the new channel in the 5 GHz radio frequency band, and in response to no client devices connecting on the current channel or the new channel in the 5 GHz radio frequency band, establish a connection with a client device on an available channel in a 2.4 GHz radio frequency band, and notify the client device to find the 5 GHz SSID of the electronic apparatus on the current channel or the new channel in the 5 GHz radio frequency band.

An aspect of the present disclosure provides a method for smart channel selection. The method may include tracking client devices that connect with a local area network (LAN) associated with a gateway device over time, storing a historical number of client devices that connect with the LAN, and a channel number on which the gateway device operated each connection with the client devices, monitoring a number of probes/association requests on channels in a 5 GHz radio frequency band that are available to broadcast a 5 GHz service set identifier (SSID) of the gateway device, and determining whether the number of probes/association requests on a current channel in the 5 GHz radio frequency band on which the gateway device is operating is less than a predefined threshold value. In response to the number of probes/association requests on the current channel being less than the predefined threshold value, the method may include performing a smart channel selection function to select a new channel in the 5 GHz radio frequency band having a number of probes/association requests that is greater than or equal to the predefined threshold value, and broadcasting the 5 GHz SSID of the gateway device on the new channel that is selected based on the smart channel selection function.

In an aspect of the present disclosure, the method may further include generating a list of channels in the 5 GHz radio frequency band that are available for Wi-Fi use, wherein the list of channels includes a lower range of channels and an upper range of channels.

In an aspect of the present disclosure, the method may further include performing an auto-channel selection function at startup of the gateway device to select a first channel from the list of channels, the first channel having a best quality among channels in the list of channels based on any of signal strength, noise, interference, channel utilization, or a combination thereof, and broadcasting the 5 GHz SSID on the current channel, wherein the current channel is the first channel that is selected based on the auto-channel selection function.

In an aspect of the present disclosure, the current channel that is selected from the list of channels based on the auto-channel selection function is a channel in the upper range of channels in the 5 GHz radio frequency band, and the new channel that is selected from the list of channels based on the smart channel selection function is a channel in the lower range of channels in the 5 GHz radio frequency band, wherein the new channel is a channel having a best quality among channels in the list of channels having a number of probes/association requests that is greater than the predefined threshold value.

In an aspect of the present disclosure, the method further includes establishing a connection with one or more client devices that detect the 5 GHz SSID of the gateway device on the new channel in the LAN.

In an aspect of the present disclosure, the method further includes determining whether any client devices connect on one of the current channel or the new channel in the 5 GHz radio frequency band, and in response to no client devices connecting on the current channel or the new channel in the 5 GHz radio frequency band, establishing a connection with a client device on an available channel in a 2.4 GHz radio frequency band, and notifying the client device to find the 5 GHz SSID of the electronic apparatus on the current channel or the new channel in the 5 GHz radio frequency band.

An aspect of the present disclosure provides a non-transitory computer-readable medium storing a program for smart channel selection. The program, when executed by a processor of an electronic apparatus, causes the electronic apparatus to perform operations including the steps of the methods described above.

The above-described electronic apparatus may be implemented as a residential network gateway (GW) device, according to some example embodiments. However, some other example embodiments are not limited thereto, and the electronic apparatus may be implemented as a wireless access point (AP), a Wi-Fi extender, or other similar electronic devices that enable wireless networking.

Thus, according to various aspects of the present disclosure described herein, it is possible to determine when client devices (e.g., non-associated client stations) may be having difficulty finding the 5 GHz SSID of the GW/AP being broadcast on a current channel (e.g., an upper channel) in the 5 GHz band, and identify and select whichever one of the channels (e.g., a lower channel) in the 5 GHz band is actually the best available channel (e.g., optimal, ideal, fastest, strongest signal, low noise, least congested, least interference, etc.) based on historical and/or current network conditions. The novel solution described herein addresses the problem of the customer's smartphone being unable to find the 5 GHz SSID of the AP, while allowing the GW/AP the opportunity to select a channel that is better for all (or most) client devices to detect and connect as compared to setting a fixed channel (e.g., channel 36), and/or to select the best available channel (e.g., from among channels 32 through 48) depending on historical and/or current network conditions.

BRIEF DESCRIPTION OF DRAWINGS

In the drawings, like reference numbers generally indicate identical, functionally similar, and/or structurally similar elements.

FIG. 8A is a chart illustrating an example memory structure of the electronic apparatus according to some example embodiments, including stored data associated with the monitoring of the LAN and performing of the smart channel selection function, with the commonly used 20/40/80 MHz wide channels shown together;

FIG. 8B is a chart illustrating an example memory structure of the electronic apparatus according to some example embodiments, with the commonly used 20/40/80 MHz wide channels shown separately.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparatus to those skill in the art that the following description is provided for illustration purposes only, and not for the purpose of limiting the present disclosure as defined by the appended claims.

Figure 1:
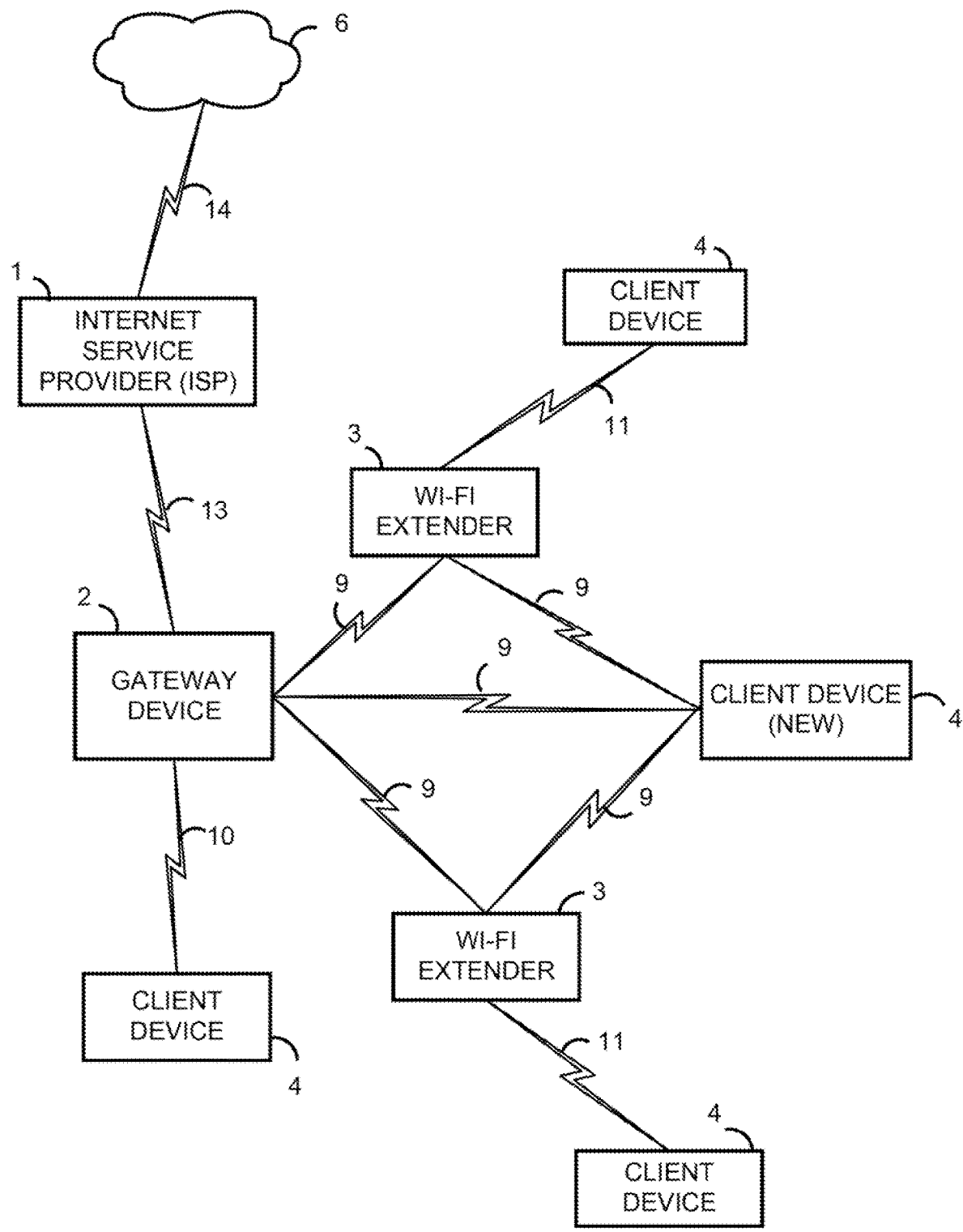
FIG. 1 is a schematic diagram of a system, according to an embodiment of the present disclosure.

FIG. 1 is a schematic diagram of a system, according to some example embodiments.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the main elements of the system include a gateway device 2 connected to the Internet 6 via an Internet Service Provider (ISP) 1 and also connected to different wireless devices such as wireless extenders 3 and client devices 4. The system shown in FIG. 1 includes wireless devices (e.g., wireless extenders 3 and client devices 4) that may be connected in one or more wireless networks (e.g., private, guest, iControl, backhaul network, or Internet of things (IoT) network) within the system. Additionally, there could be some overlap between wireless devices (e.g., wireless extenders 3 and client devices 4) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the ISP 1 can be, for example, a streaming video provider or any computer for connecting the gateway device 2 to the Internet 6. The connection 14 between the Internet 6 and the ISP 1 and the connection 13 between the ISP 1 and the gateway device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 13 is capable of providing connections between the gateway device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The gateway device 2 can be, for example, a hardware electronic device that may be a combination modem and gateway device that combines the functions of a modem, an access point (AP), and/or a router for providing content received from the content provider 1 to network devices (e.g., wireless extenders 3 and client devices 4) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The gateway device 2 may also be referred to as a residential gateway, a home network gateway, or a wireless access point (AP).

The connection 9 between the gateway device 2, the wireless extenders 3, and client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection.

The wireless extenders 3 can be, for example, hardware electronic devices such as access points (APs) used to extend the wireless network by receiving the signals transmitted by the gateway device 2 and rebroadcasting the signals to, for example, client devices 4, which may out of range of the gateway device 2. The wireless extenders 3 can also receive signals from the client devices 4 and rebroadcast the signals to the gateway device 2, or other client devices 4.

The connection 11 between the wireless extenders 3 and the client devices 4 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers, electronic tablets, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. Additionally, the client devices 4 can be a television (TV), an IP/QAM set-top box (STB) or a streaming media decoder (SMD) that is capable of decoding audio/video content, and playing over OTT or MSO provided content received through the gateway device 2.

The connection 10 between the gateway device 2 and the client device 4 is implemented through a wireless connection that operates in accordance with, but is not limited to, any IEEE 802.11 protocols. Additionally, the connection 10 between the gateway device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 10 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 10 can also be a wired Ethernet connection.

Figure 2:
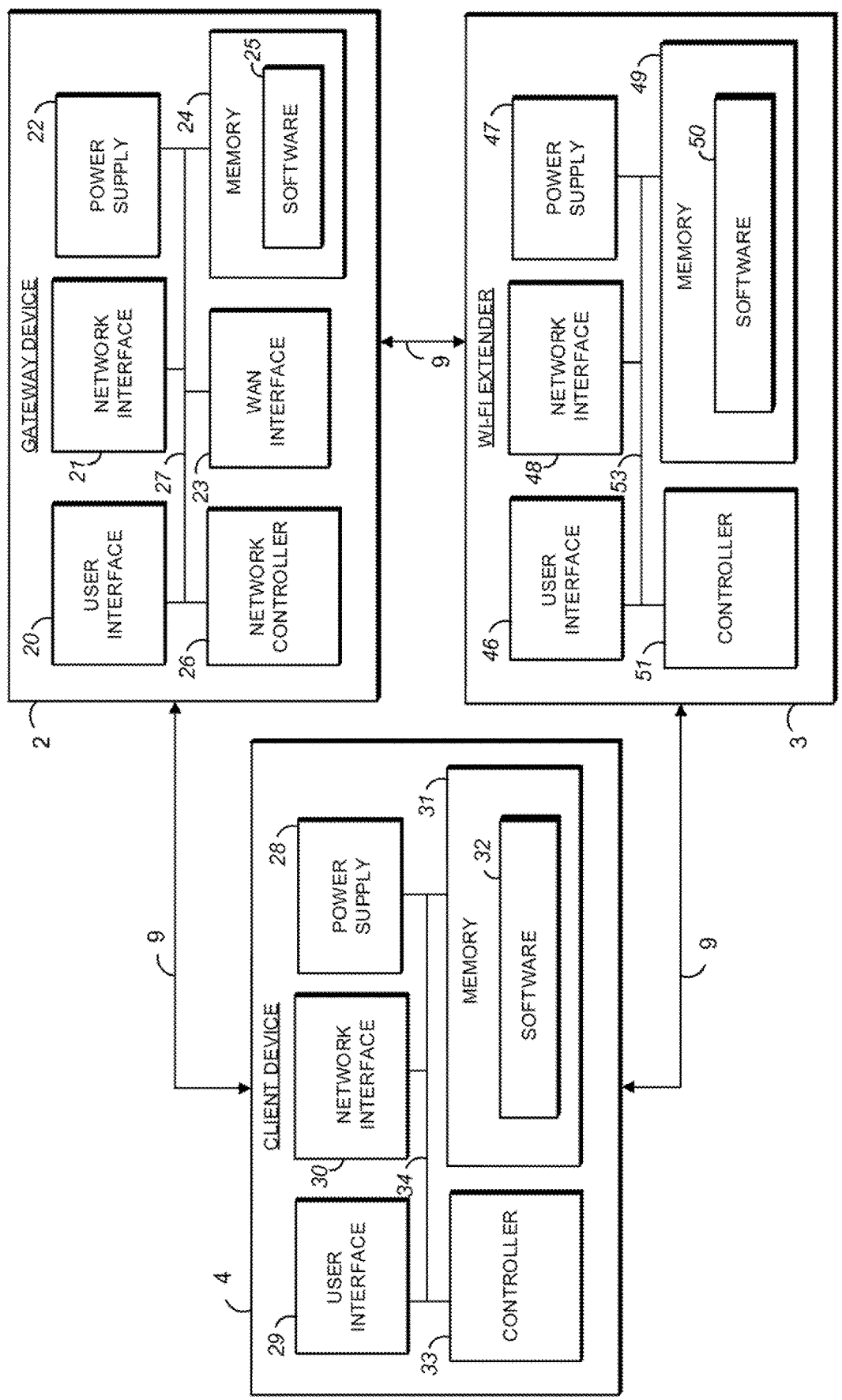
FIG. 2 is a more detailed block diagram illustrating various components of an exemplary gateway device, client device, and wireless extender implemented in the system of FIG. 1 according to an embodiment of the present disclosure.

A detailed description of the exemplary internal components of the gateway device 2, the wireless extenders 3, and the client devices 4 shown in FIG. 1 will be provided in the discussion of FIG. 2. However, in general, it is contemplated by the present disclosure that the gateway device 2, the wireless extenders 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the gateway device 2, the wireless extenders 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the wireless extenders 3, and the client devices 4 are further equipped with components to facilitate communication with other computing devices over the one or more network connections to local and wide area networks, wireless and wired networks, public and private networks, and any other communication network enabling communication in the system.

FIG. 2 is a more detailed block diagram illustrating various components of an exemplary gateway device, client device, and wireless extender implemented in the system of FIG. 1, according to some example embodiments.

Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 9 between the gateway device 2, the wireless extender 3, and the client device 4 shown in FIG. 2 are meant to be exemplary connections and are not meant to indicate all possible connections between the gateway devices 2, wireless extenders 3, and client devices. Additionally, it is contemplated by the present disclosure that the number of gateway devices 2, wireless extenders 3, and client devices 4 is not limited to the number of gateway devices 2, wireless extenders 3, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the gateway device 2. Additionally, the client device 4 can be a TV, an IP/QAM STB, or an SMD that is capable of decoding audio/video content, and playing over OTT or MSO provided content received through the gateway device 2.

As shown in FIG. 2, the client device 4 includes a power supply 28, user interface 29, network interface 30, a memory 31, and a controller 33.

The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the gateway device 2 and the wireless extender 3 using the communication protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (e.g., 28-31 and 33) of the client device 4 may be established using an internal bus 34.

The wireless extender 3 can be, for example, a hardware electronic device such as an access point (AP) used to extend a wireless network by receiving the signals transmitted by the gateway device 2 and rebroadcasting the signals to client devices 4, which may be out of range of the gateway device 2. The wireless extender 3 can also receive signals from the client devices 4 and rebroadcast the signals to the gateway device 2, mobile device 5, or other client devices 4.

As shown in FIG. 2, the wireless extender 3 includes a user interface 46, a power supply 47, a network interface 48, a memory 49, and a controller 51.

The user interface 46 can include, but is not limited to, push buttons, a keyboard, a keypad, an LCD, a TFT, an LED, an HD or other similar display device including a display device having touch screen capabilities so as to allow interaction between a user and the wireless extender 3.

The power supply 47 supplies power to the internal components of the wireless extender 3 through the internal bus 53. The power supply 47 can be connected to an electrical outlet (e.g., either directly or by way of another device) via a cable or wire.

The network interface 48 can include various network cards, interfaces, and circuitry implemented in software and/or hardware to enable communications with the client device 4 and the gateway device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul (BH) connection between the wireless extender 3 and the gateway device 2, and optionally other wireless extender(s) 3. Another radio or set of radios (e.g., 2.4 GHz, 5 GHz, and/or 6 GHz radio(s)) provides a fronthaul (FH) connection between the wireless extender 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender 3 in accordance with the embodiments described in the present disclosure.

The controller 51 controls the general operations of the wireless extender 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender 3 in accordance with the embodiments described in the present disclosure. General communication between the components (e.g., 46-49 and 51) of the wireless extender 3 may be established using the internal bus 53.

The gateway device 2 can be, for example, a hardware electronic device that can combine the functions of a modem, an access point (AP), and/or a router for providing content received from the content provider (ISP) 1 to network devices (e.g., wireless extenders 3, client devices 4) in the system. It is also contemplated by the present disclosure that the gateway device 2 can include the function of, but is not limited to, an IP/QAM STB or SMD that is capable of decoding audio/video content, and playing OTT or MSO provided content.

As shown in FIG. 2, the gateway device 2 includes a user interface 20, a network interface 21, a power supply 22, a wide area network (WAN) interface 23, a memory 24, and a network controller 26.

The user interface 20 can include, but is not limited to, push buttons, a keyboard, a keypad, an LCD, a TFT, an LED, an HD or other similar display device including a display device having touch screen capabilities so as to allow interaction between a user and the gateway device 2.

The network interface 21 may include various network cards, and circuitry implemented in software and/or hardware to enable communications with the wireless extender 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the communication protocols in accordance connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul (BH) connection between the gateway device 2 and the wireless extender(s) 3. Another radio or set of radios (e.g., 2.4 GHz, 5 GHz, and/or 6 GHz radio(s)) provides a fronthaul (FH) connection between the gateway device 2 and one or more client device(s) 4.

The power supply 22 supplies power to the internal components of the gateway device 2 through the internal bus 27. The power supply 22 can be connected to an electrical outlet (e.g., either directly or by way of another device) via a cable or wire.

The wide area network (WAN) interface 23 may include various network cards, and circuitry implemented in software and/or hardware to enable communications between the gateway device 2 and the ISP 1 using the wired and/or wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the gateway device 2 and performing management functions related to the other devices (wireless extenders 3 and client devices 4) in the network in accordance with the embodiments described in the present disclosure (e.g., including a smart channel selection function according to some example embodiments of the present disclosure).

The network controller 26 controls the general operations of the gateway device 2 as well as performs management functions related to the other devices (wireless extenders 3 and client device 4) in the network. The network controller can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the gateway device 2 in accordance with the embodiments described in the present disclosure. Communication between the components (e.g., 20-22, 24, and 26) of the gateway device 2 may be established using the internal bus 27. The network controller 26 may also be referred to as a processor, generally.

Figure 3:
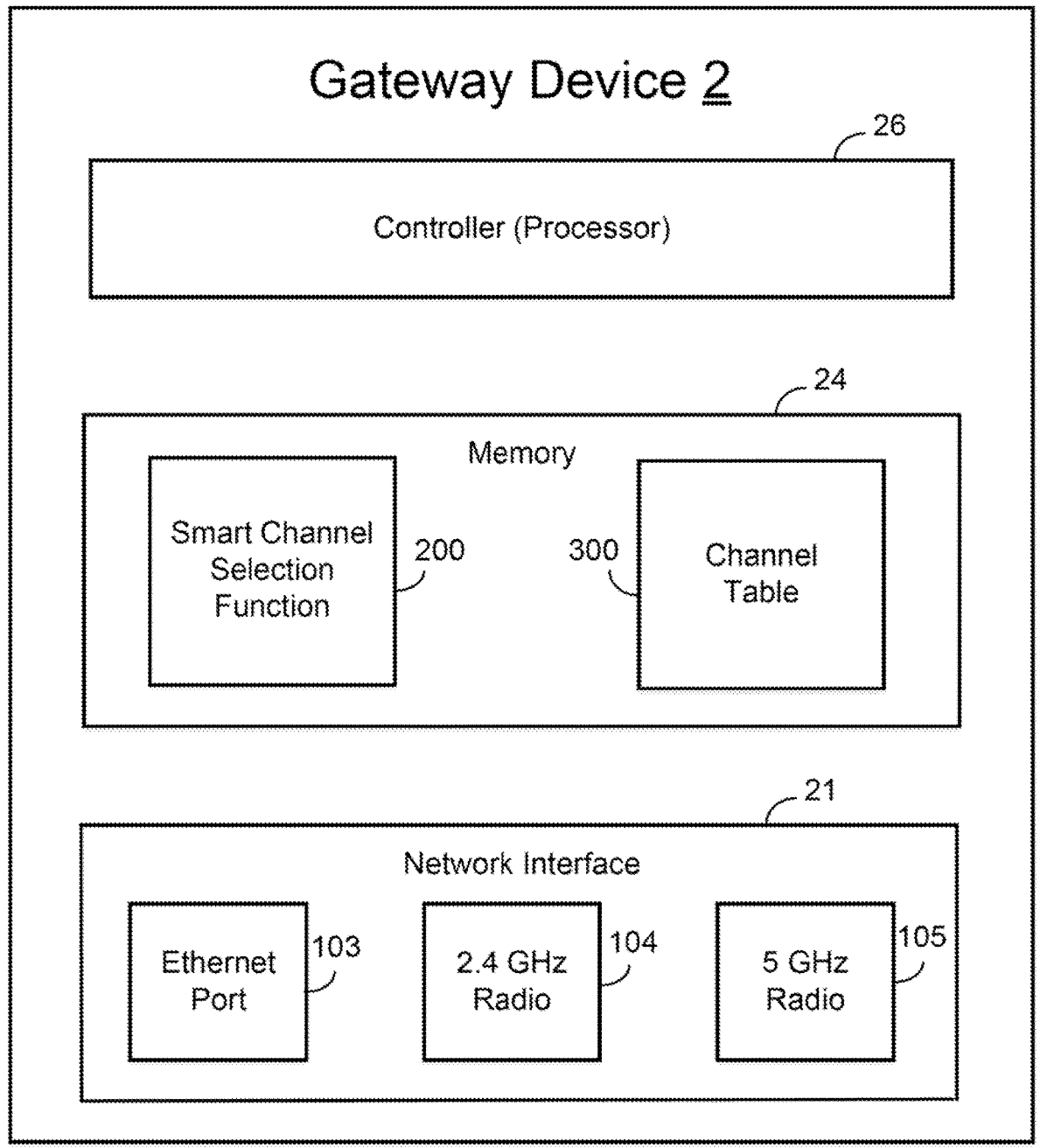
FIG. 3 is a more detailed block diagram illustrating certain components of an exemplary gateway device implemented in the system of FIGS. 1-2 according to an embodiment of the present disclosure.

FIG. 3 is a more detailed block diagram illustrating certain components of an exemplary gateway device implemented in the system of FIGS. 1 and 2, according to some example embodiments.

As shown in FIG. 3, the gateway device 2 includes the network interface 21, the memory 24, and the controller (processor) 26.

The network interface 21 includes an Ethernet port 103 (e.g., a wired LAN interface), a 2.4 GHz radio 104 and a 5 GHz radio 105 (e.g., wireless LAN interfaces, or WLAN interfaces). The gateway device 2 may communicate with the local area network devices (e.g., the wireless extenders 3, the client devices 4) of the system via one or more of the Ethernet port 103, the 2.4 GHz radio 104, and/or the 5 GHz radio 105. However, some other example embodiments of inventive concepts of the present disclosure are not limited to these interfaces only (e.g., the techniques may be applied with a 6 GHz radio or other similar future developed technologies). As mentioned above, according to aspects of the present disclosure, one radio or set of radios can provide a backhaul (BH) connection between the gateway device 2 and the wireless extender(s) 3, while another radio or set of radios can provide a fronthaul (FH) connection between the gateway device 2 and the client device(s) 4.

The memory 24 includes a smart channel selection function 200 and a channel table 300. The smart channel selection function 200 may be implemented as part of the instructions, algorithms, or software including the software 25 described above with reference to FIG. 2. The channel table 300 may be a data structure storing various pieces of data relating to the LAN, Wi-Fi channels, client devices, and certain values for use when performing operations in accordance with embodiments described in the present disclosure (e.g., including the smart channel selection function according to some example embodiments).

The controller 26 includes a processor that is configured to access the memory 24, perform the smart channel selection function 200 (e.g., via execution of the software 25), and make wireless channel selection determinations based on the information in channel table 300. The processor of the controller 26 also controls communications with the network devices (e.g., the wireless extenders 3, the client devices 4) via the Ethernet port 103, the 2.4 GHz radio 104, and/or the 5 GHz radio 105 in accordance with embodiments described in the present disclosure.

Figure 4:
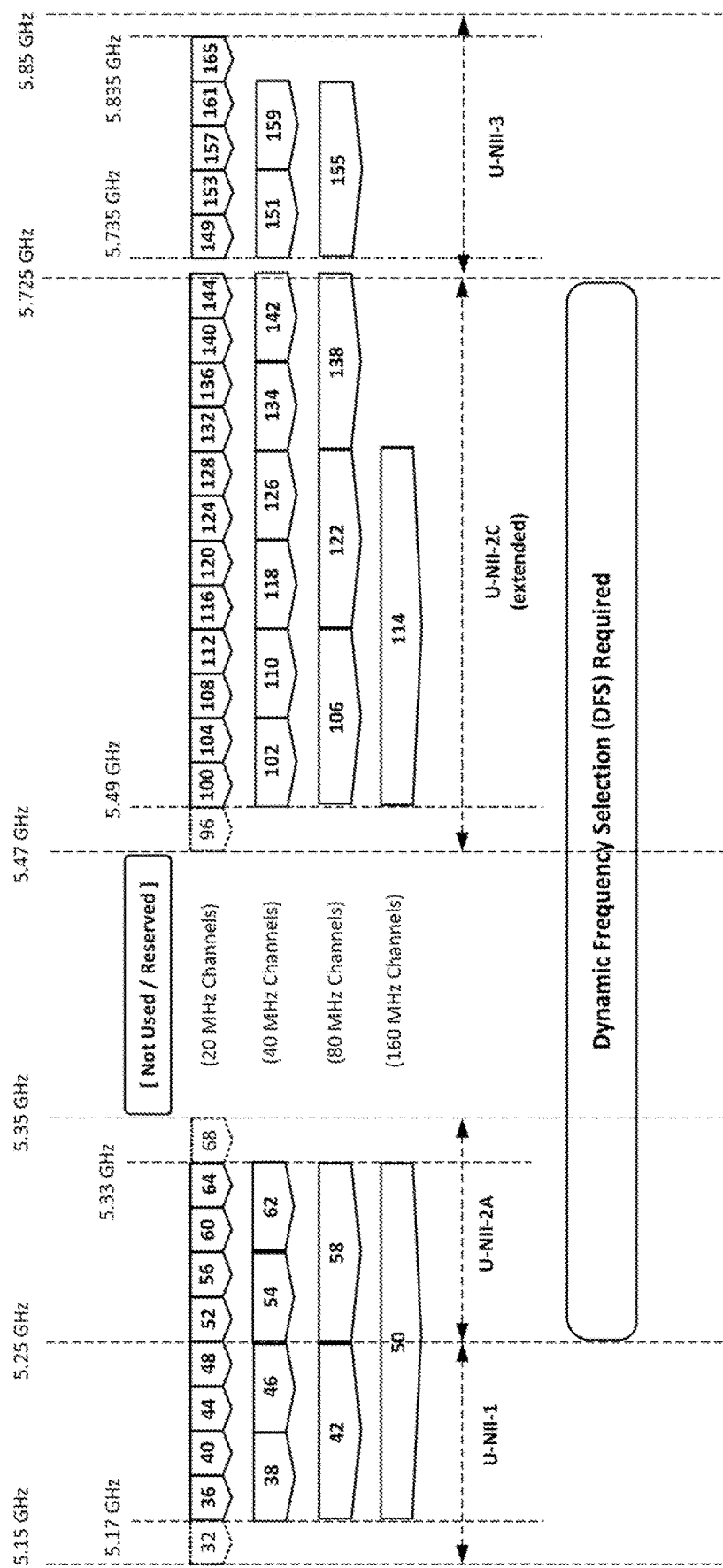
FIG. 4 is a diagram illustrating an example of channels in the 5 GHz radio frequency band that are currently available for unlicensed Wi-Fi use, which are divided into corresponding U-NII frequency bands.

FIG. 4 is a diagram illustrating an example of channels in the 5 GHz radio frequency band that are currently available for unlicensed Wi-Fi use, which are divided into corresponding U-NII frequency bands, according to some example embodiments.

As shown in FIG. 4, according to IEEE 802.11 Wi-Fi standards, the 5 GHz channels are in the range from 5.15-5.35 GHz (channels 32 through 68) and 5.47-5.85 GHz (channels 96 through 165). In the United States, for example, these 5 GHz channels are currently divided into 4 groups (also referred to as U.S. FCC U-NII bands):
 (1) U-NII-1 (5.15-5.25 GHz) including channels in the range of 32-48,
 (2) U-NII-2a (5.25-5.35 GHz) including channels in the range 52-68,
 (3) U-NII-2c (extended) (5.47-5.725 GHz) including channels in the range of 96-144, and
 (4) U-NII-3 (5.725-5.85 GHz) including channels in the range of 149-165.

These 5 GHz channels may be referred to as a lower range (e.g., channels 36 through 48, and optionally channel 32), a middle range (e.g., channels 52 through 64 and channels 100 through 144, and optionally channels 68 and 96), and an upper range (e.g., channels 149 through 161, and optionally 165). In some instances, the 20 MHz wide channels at the edges of the U-NII bands that are available for unlicensed Wi-Fi use may or may not be used by gateway devices and APs (e.g., channels 32, 68, 96, 165 are optional, but may not be as commonly used in some network deployments for various reasons).

The 5 GHz channels in the middle range (e.g., channels 50 through 68 and channels 100 through 144) are known as DFS channels, referring to a Dynamic Frequency Selection function that enables WLAN devices to use 5 GHz frequencies that are generally reserved for radar (e.g., military, weather). However, some gateway devices and APs may not have a DFS function equipped (e.g., to save costs) or may have the DFS function disabled by default (e.g., to avoid recurring loss of wireless connectivity while periodically scanning the available frequencies in the DFS band). Even with the DFS function enabled, however, many currently existing client devices cannot even be tuned to the intermediate DFS channels. Thus, the intermediate DFS channels (e.g., channels 52 through 68 and channels 96 through 144) in the 5 GHz band are often avoided by gateway devices and APs for establishing connections with client devices in most Wi-Fi deployments.

In a case of using 20 MHz wide channels within the 5 GHz band, there are at least 24 non-overlapping channels (and optionally up to 28 non-overlapping channels in some instances): (1) Group UNII-1 may include channels 36, 40, 44, 48 (and optionally channel 32 in some instances); (2) Group UNII-2a may include channels 52, 56, 60, 64 (and optionally channel 68 in some instances), and Group UNII-2c (extended) may include channels 100, 104, 108, 112, 116, 120, 124, 128, 132, 136, 140, 144 (and optionally channel 96 in some instances); and (3) Group UNII-3 may include channels 149, 153, 157, 161 (and optionally channel 165 in some instances). Use of 20 MHz wide channels is common in many currently existing Wi-Fi deployments, and may be more desirable for densely populated environments over 40 MHz wide channels due to having less noise, better sensitivity, more transmit power, and the like. In the 20 MHz wide channel case, there are 8 non-overlapping non-DFS channels (e.g., channels 36, 40, 44, 48, 149, 153, 157, 161, and optionally 10 non-overlapping non-DFS channels if channels 32 and 165 are permitted) in the 5 GHz band.

In a case of using 40 MHz wide channels within the 5 GHz band, there are 12 non-overlapping channels: (1) Group UNII-1 may include channels 38, 46; (2) Group UNII-2a may include channels 54, 62, and Group UNII-2c (extended) may include channels 102, 110, 118, 126, 134, 142; and (3) Group UNII-3 may include channels 151, 159. Use of 40 MHz wide channels may be preferable over 20 MHz wide channels in instances of heavy file transfers, HD video streaming, and other high bandwidth-intensive applications. In the 40 MHz wide channel case, there are 4 non-overlapping non-DFS channels (e.g., channels 38, 46, 151, 159) in the 5 GHz band.

In a case of using 80 MHz wide channels within the 5 GHz band, there are 6 non-overlapping channels: Group UNII-1 may include channel 42; Group UNII-2a may include channel 58, and Group UNII-2c (extended) may include channels 106, 122, 138; and Group UNII-3 may include channel 155. The 80 MHz wide channels may be used in quieter and more sparsely populated network environments (with corresponding performance gains and more throughput), but may not be appropriate for denser deployments. In the 80 MHz wide channel case, there are only 2 non-overlapping non-DFS channels (42, 155) in the 5 GHz band. It should be noted that 160 MHz channels are currently only used for small office/home office (SOHO) WLAN AP deployments or for point-to-point communications (160 MHz wide channels are not currently being used by existing enterprise APs). Pending approval of use of the 6 GHz band for public Wi-Fi purposes is needed in order for residential gateway devices, enterprise APs, and most client devices to take advantage of 160 MHz wide channels, as well as to enhance the use of 80 MHz wide channels. Therefore, 80 MHz wide channels and 160 MHz wide channels are not being used in most currently existing Wi-Fi deployments.

The specific channel numbers set forth herein are recommended to allow for the most use of the 5 GHz spectrum, by providing the greatest number of non-overlapping channels, as shown in FIG. 4. However, it should be appreciated that certain Wi-Fi deployments may vary from these default channel numbers based on environmental factors, desired channel width, currently existing or future-developed technologies, types of devices involved and their capabilities, and other unforeseen obstacles. Accordingly, although some example embodiments of inventive concepts disclosed herein will be discussed below with reference to specific channel numbers, some other example embodiments of inventive concepts disclosed herein are not limited to any particular channel numbers, except in any instances as may be explicitly specified in the claims below. In addition, some example embodiments set forth herein may be applied in the context of the 6 GHz radio frequency band for future use case scenarios as the next-gen Wi-Fi 6 technology gains increased implementation in the field.

Figure 5:
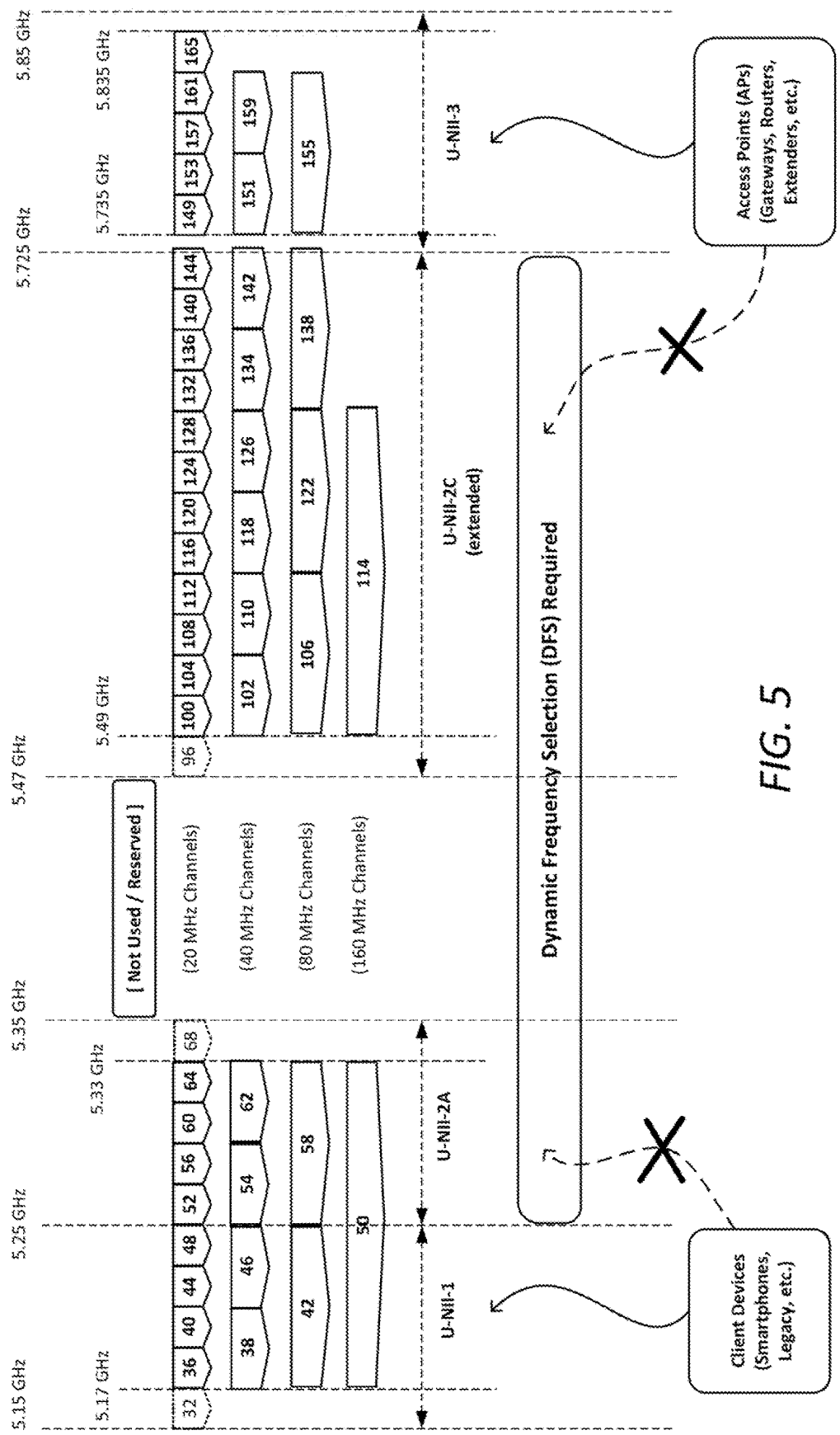
FIG. 5 is a diagram illustrating a problem existing in the related art, which is solved according to some example embodiments, in a case of currently available channels in the 5 GHz frequency band and excluding DFS channels.

FIG. 5 is a diagram illustrating a problem existing in the related art, which is solved according to some example embodiments, in a case of currently available channels in the 5 GHz frequency band and excluding DFS channels.

Referring back to the increasing preference for 5 GHz channels over 2.4 GHz channels, many customers often experience a problem that some of their client devices such as smartphones are not finding the 5 GHz service set identifier (SSID) of the AP. This typically happens because the auto-channel selection function of APs tends to select higher 5 GHz channel numbers (e.g., in the higher range of non-DFS channels 149 through 165), but many popular smartphones and other client devices typically do not operate on higher channels and instead these smartphones tend to select lower 5 GHz channel numbers (e.g., in the lower range of non-DFS channels 36 through 48). For example, client devices sending probes on the higher 5 GHz channels (e.g., channels 149-165) would consume more power, and client devices may be programmed to only scan certain channels (instead of all available channels) to optimize roaming performance. Thus, the smartphones and the APs may "miss" each other when the APs are transmitting beacons and/or listening for probes/association requests on the higher UNII-3 channels (channels 149-165) while the smartphones are listening for beacons and/or transmitting probes/association requests on the lower UNII-1 channels (channels 36-48). As mentioned above, the smartphones may be unable to use and/or the APs may be configured not to use the intermediate DFS channels (e.g., in the middle range of channels 52-68 and channels 96-144) in many Wi-Fi deployments.

Additionally or alternatively, the customer's smartphones may be unable to find the 5 GHz SSID of the AP due to channel interference. For example, the smartphone may not hear a beacon on a certain channel, and/or probes on said interfered-with channel may not reach the AP. This is also because the AP hardware (e.g., antennas and power supply) is more powerful in comparison to client station hardware, such that client devices may suffer more interference compared to the AP.

The above-described problem confounds the Multi-AP/HNC scenario where all APs advertise the same 5 GHz SSIDs, but some of the APs do not receive any probes from some client devices, nor do those client devices receive any beacons from those APs. Normally, the Non-associated client station probes received by the AP are forwarded to the controller (HNC) to aid in steering logic. However, this problem causes some of the APs within Multi-AP deployments to miss Non-associated client station probes, even though the Non-associated client station is within hearing distance of the AP, thus hampering the steering logic.

The known solution of disabling the auto-channel selection function of the GW/AP and setting a fixed channel does not consider or identify which one of these lower channels is actually the best available channel (e.g., optimal, ideal, fastest, strongest signal, low noise, least congested, least interference, etc.) based on historical and/or current network conditions. Thus, this known solution deprives the AP of the opportunity to select a better channel than the fixed channel (e.g., channel 36) and/or to select the best available channel (e.g., from among channels 32 through 48) depending on historical and/or current network conditions.

Therefore, there is a need to provide improved electronic apparatuses (e.g., home network gateway (GW) devices, wireless access points (APs), Wi-Fi extenders, etc.) that are configured to perform a method to find the client device(s) (e.g., smartphones and the like) and also select an optimal or ideal 5 GHz channel for operation that is usable by all (or most) of the client devices within a particular WLAN environment (including any Non-associated client stations).

Figure 6:
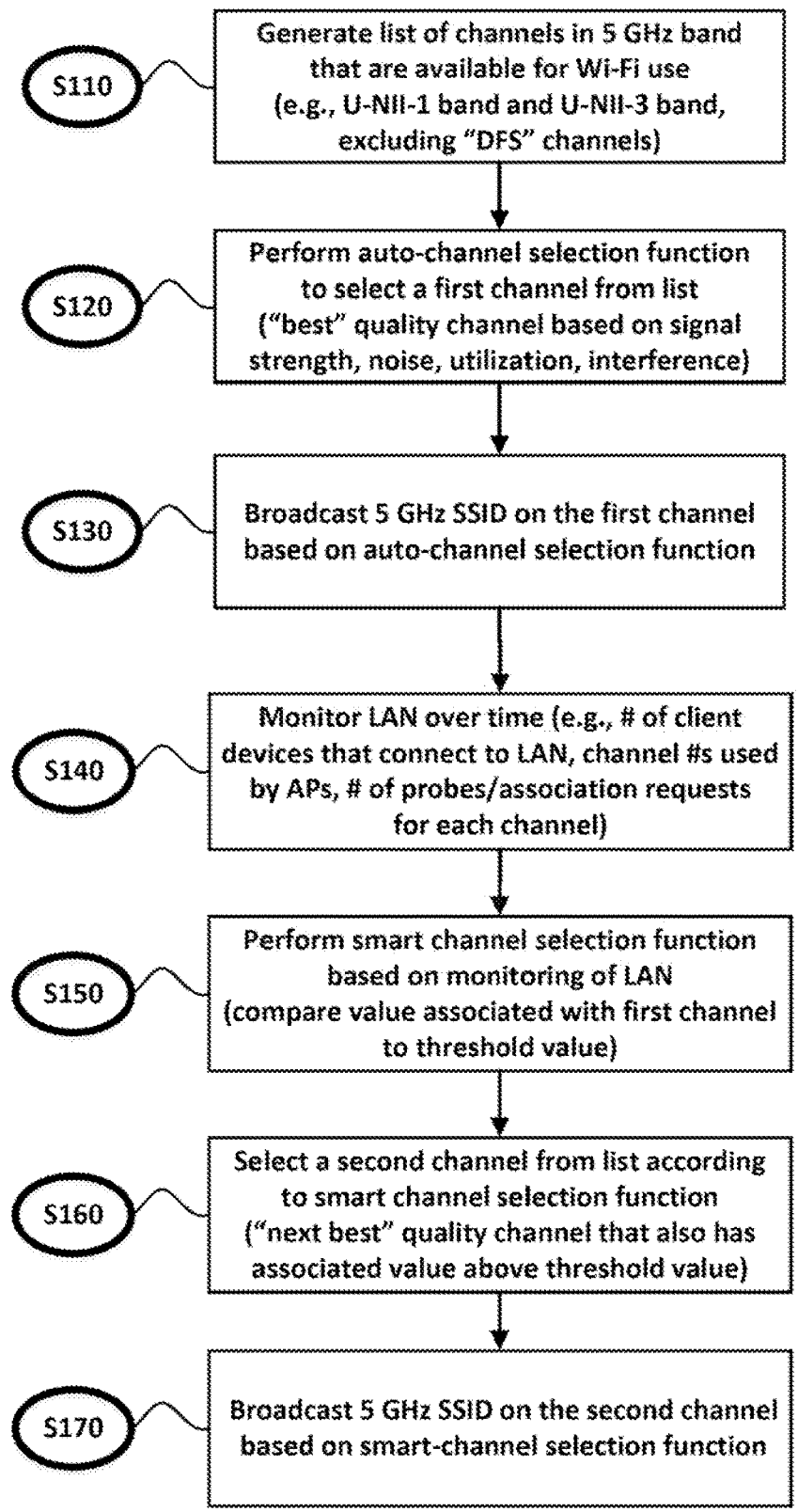
FIG. 6 is a flow chart illustrating a method for smart channel selection, according to an embodiment of the present disclosure.

FIG. 6 is a flow chart illustrating a method for smart channel selection, according to some example embodiments.

Although the method of FIG. 6 is discussed in connection with a gateway device 2 according to some example embodiments, the method could similarly be performed by a wireless extender 3, a wireless access point (AP), and/or other similar Wi-Fi networking devices according to some other example embodiments. The gateway device 2 may be programmed with instructions (e.g., HNC controller instructions) to perform the smart channel selection function in some example embodiments, or may use its native software in some other example embodiments. In FIG. 6, it is assumed that the devices include their respective controllers and their respective software stored in their respective memories, as discussed above in connection with FIGS. 2-3, which when executed by their respective controllers perform the functions and operations in accordance with the example embodiments of the present disclosure (e.g., including performing a smart channel selection function).

At step S110, the gateway device 2 generates a list of channels in the 5 GHz frequency band that are available for Wi-Fi use. In some example embodiments, the list of channels may include channels in the U-NII-1 band (channels 32-48) and U-NII-3 band (channels 149-165), and may exclude DFS channels in the U-NII-2 band (channels 96-144). However, some other example embodiments are not limited thereto, and the list may also include the DFS channels in the U-NII-2 band in instances where the network devices are equipped to satisfy the scanning requirements for DFS.

At step S120, the gateway device 2 performs an auto-channel selection function to select a first channel from the list (the list of channels that was generated at S110). In some example embodiments, the auto-channel selection function may identify the channel having the "best" quality based on one or more factors, including but not limited to received signal strength indicator (RSSI), noise, signal-to-noise ratio (SNR), channel utilization, interference, or combinations thereof. However, some other example embodiments of determining channel quality are not limited to these factors alone. For example, the gateway device 2 may generate a score (e.g., a percentage, a ratio, a fractional value, etc.) or a ranking (e.g., in sequence 1, 2, 3, etc.) based on various pieces of stored data relating to the network, channels, and client devices.

At step S130, the gateway device 2 then broadcasts the 5 GHz SSID on the first channel (the channel that was identified as the best quality channel based on the auto-channel selection function at step S120).

At step S140, the gateway device 2 monitors the local area network (LAN) over time, to collect various data relating to the network. For example, the gateway device 2 may monitor and store data including, but not limited to, the number of client devices that connect to the LAN (e.g., the historical average number of clients which normally get connected at home), and also the channels number with which the connection operated. When the gateway device 2 is operating with its auto-channel selection function activated, the gateway device 2 will also monitor the number of probes/association requests on each channel broadcasting the SSIDs for each radio (e.g., the 5 GHz SSID).

At step S150, the gateway device 2 performs a smart channel selection function, based on the data stored as a result of monitoring the LAN over time. In some example embodiments, the gateway device 2 may compare a value associated with the first channel (e.g., some of the LAN data collected and stored at step S140) to some predetermined and/or configurable threshold value during execution of the smart channel selection function, and then make a channel selection decision based on the threshold comparison.

At step S160, the gateway device 2 selects a second channel from the list of channels according to the smart channel selection function. For example, the gateway device 2 may select the "next best" quality channel from the list that also has a value associated therewith that is above the threshold value. For example, the value associated with the second channel may be a historical measurement from the initial channel selection discussed above.

At step S170, the gateway device 2 broadcasts the 5 GHz SSID on the second channel (the channel that was identified as the next best quality channel that also has an associated value that is above the threshold value at step S160).

Once the gateway device 2 has switched to broadcasting the 5 GHZ SSID on the new channel, the client devices 4 should be able to find the 5 GHZ SSID of the gateway device 2 on the new channel and establish a 5 GHz Wi-Fi connection with the gateway device 2 over the new channel. Some additional description of certain steps of the method for smart channel selection of FIG. 6, according to some example embodiments, will be discussed below in connection with FIG. 7.

Figure 7:
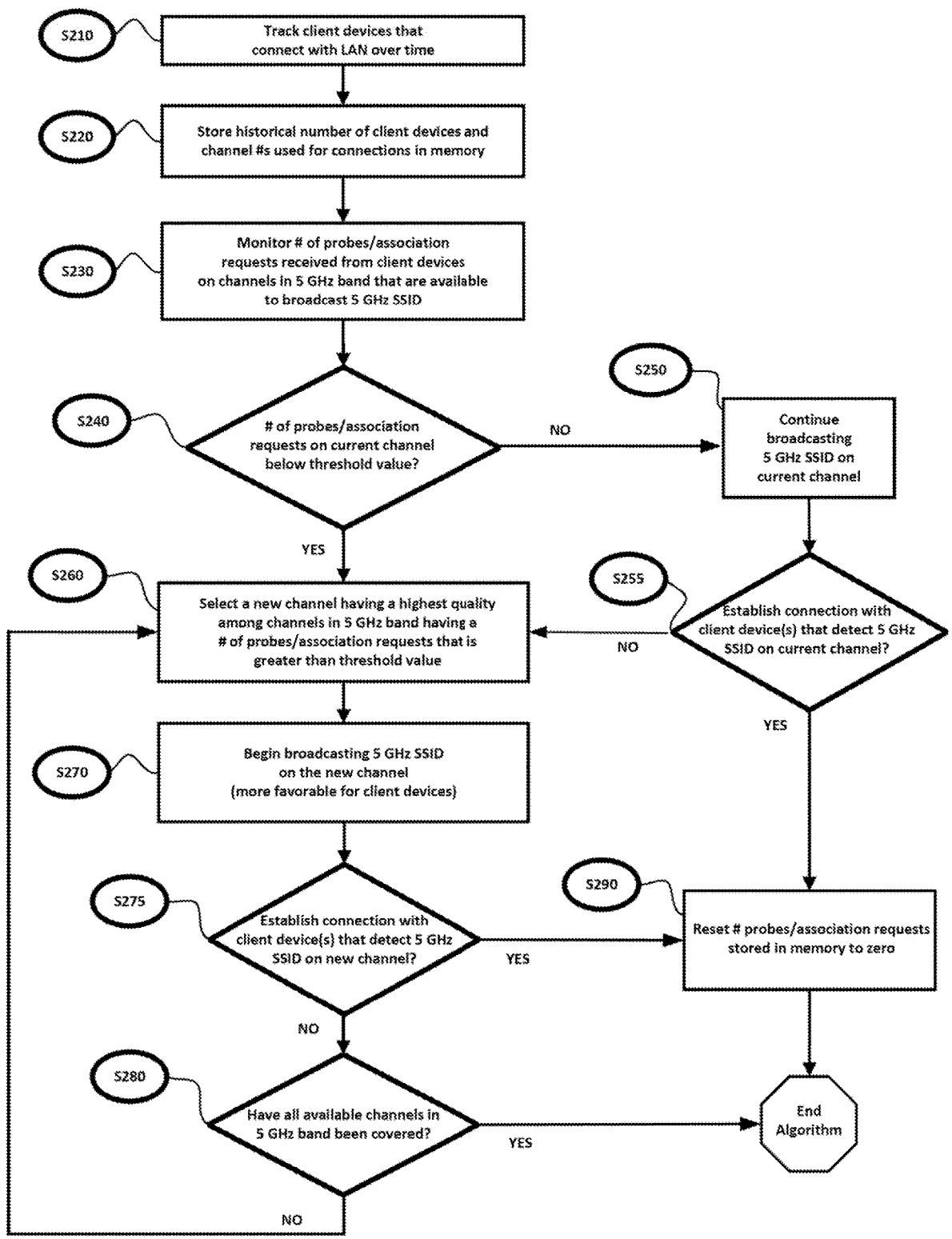
FIG. 7 is a flow chart illustrating further details of a method for smart channel selection, according to an embodiment of the present disclosure.

FIG. 7 is a flow chart illustrating further details of a method for smart channel selection, according to some example embodiments.

In FIG. 7, steps S210-S230 relate to the monitoring step S140 of FIG. 6, and steps S240-S290 relate to the smart channel analysis and selection steps S150-S170 of FIG. 6. Although the method of FIG. 7 is discussed in connection with a gateway device 2 according to some example embodiments, the method could similarly be performed by a wireless extender 3, a wireless access point (AP), and/or other similar Wi-Fi networking devices according to some other example embodiments. The gateway device 2 may be programmed with instructions (e.g., HNC controller instructions) to perform the smart channel selection function in some example embodiments, or may use its native software in some other example embodiments. In FIG. 7, it is assumed that the devices include their respective controllers and their respective software stored in their respective memories, as discussed above in connection with FIGS. 2-3, which when executed by their respective controllers perform the functions and operations in accordance with the example embodiments of the present disclosure (e.g., including performing a smart channel selection function).

At step S210, the gateway device 2 tracks the client devices 4 that connect with the LAN over time. At step S220, the gateway device 2 stores a historical number of client devices that connect to the LAN (e.g., the historical average number of clients which normally get connected at home), and also the channel number with which the connection operated, in the memory of the gateway device 2.

In addition, at step S230, the gateway device 2 monitors a number of probes/association requests received from the client devices 4 on channel broadcasting the SSIDs for each radio (e.g., the channels in the 5 GHz radio frequency band that are available to broadcast the 5 GHz SSID of the gateway device 2). For example, the gateway device 2 may monitor the number of probes/association requests on channels while operating with its auto-channel selection function activated. Equipped with the data that is stored as a result of the monitoring of the LAN over time, the gateway device 2 can perform the smart channel selection function.

At step S240, the gateway device 2 compares the number of probes/association requests on the current channel (e.g., the stored data associated with the first channel that was selected as a result of the auto-channel selection function of step S120 of FIG. 6) to a threshold value (e.g., a minimum threshold number of probes/association requests). As mentioned above, the threshold value may be a predetermined value and/or may be dynamically reconfigured as needed. The gateway device 2 then determines whether the number of probes/association requests on the current channel (e.g., the first channel) is below the threshold value at step S240.

If the gateway device 2 determines that the number of probes/association requests is greater than or equal to the threshold value (NO at step S240), then the gateway device 2 will continue broadcasting the 5 GHz SSID on the current channel (the first channel) at step S250. In this instance, the current channel (the first channel) having more than the threshold number of probes/association requests associated therewith in the memory of the gateway device 2 may indicate that the current channel (the first channel) is a good channel that is favorable for at least some of the client devices 4 in the LAN to detect and connect. At step S255, the gateway device 2 may establish a connection with one or more client devices that detect the 5 GHz SSID on the current channel in the LAN. Once the client device(s) get associated with the gateway device 2, the number of probes/association requests will reduce to zero (except in cases where a new client shows up). Unless a new client device 4 arrives in proximity to the gateway device 2, the gateway device will reset the number of probes/association requests stored in memory at S290, and end the algorithm.

Thus, when the gateway device 2 is on a particular 5 GHz channel, for which the number of client probes/association request have already reached historical averages, and on which the gateway device 2 successfully establishes a connection with client device(s) 4, the process according to aspects of the present disclosure may end. However, if the gateway device 2 does not establish a connection with any client device(s) 4 on the current channel (NO at step S255), the method may proceed to step S260, discussed below in connection with the smart channel selection function.

On the other hand, referring back to step S240, if the gateway device 2 determines that the number of probes/association requests is less than the threshold value (YES at step S240), then method will proceed to step S260. At step S260, the gateway device 2 will select a new channel during execution of the smart channel selection function. According to some example embodiments, the current channel (the first channel) having fewer than the threshold number of probes/association requests associated therewith in the memory of the gateway device 2 serves as an indicator that the current channel (the first channel) may be suboptimal for all client devices in the LAN to be able to detect and connect. However, the new channel selected from the list of channels by the gateway device 2 as a result of performing the smart channel selection function may be the channel that has the highest quality among those channels in the 5 GHz radio frequency band that also has a number of probes/association requests that is greater than or equal to the threshold value. For example, the value associated with the new channel (the second channel) may be a historical measurement stored in the memory of the gateway device 2 from the initial channel selection discussed above. In other words, the new channel (the second channel that was selected as a result of the smart-channel selection function of steps S150 and S160 of FIG. 6) is considered the "next best" option after the current channel (the first channel) in terms of quality, while also being considered a "better" channel (or more popular channel) for most or all of the client devices 4 in the LAN to be able to detect in comparison.

At step S270, the gateway device 2 begins broadcasting the 5 GHz SSID on the new channel. Again, the goal of the smart channel selection function is to identify the new channel (the second channel) that will make it more likely for client devices 4 to be able to detect and connect than the current channel (the first channel). At step S275, the gateway device 2 may establish a connection with one or more client devices 4 that detect the 5 GHz SSID of the gateway device 2 on the new channel (the second channel) in the LAN. Once the client device(s) get associated with the gateway device 2, the number of probes/association requests may reduce to zero (except in cases where a new client shows up). Unless a new client device 4 arrives in proximity to the gateway device 2, the gateway device 2 will reset the number of probes/association requests stored in the memory at step S290, and end the algorithm. Thus, when the gateway device 2 is on a newly selected 5 GHz channel, for which the number of client probes/association request have already reached historical averages, and on which the gateway device 2 successfully establishes a connection with client device(s) 4, the process according to aspects of the present disclosure may end.

However, if the gateway device 2 does not establish a connection with any client device(s) 4 on the current channel (NO at step S275), the method may proceed to step S280. At step S280, the gateway device 2 determines whether all of the available channels in the 5 GHz band have been covered. If there are still available channels in the 5 GHz band remaining to be attempted (NO at step S280), the method can loop back to step S260 to select another new channel (e.g., a third channel, a fourth channel, etc.), and repeat steps S270-S275. In some example embodiments, the other new channel may be a channel in the lower range (e.g., U-NII-1 band channels 32-48). In some other example embodiments, the gateway device can switch back to the upper range (e.g., U-NII band channels 149-165) to select the other new channel. On the other hand, if all the available channels in the 5 GHz band, including but not limited to the lower range (e.g., U-NII-1 band channels 32-48) and the upper range (e.g., U-NII-3 band channels 149-165), have been tried for the purpose of detecting and establishing connections with clients (YES at step S280), then the algorithm may end. For example, there may be no new client devices in the area, substantial interference, or some other technical issue in such instances, in which case the gateway device 2 may end the process, or possibly restart and repeat the process (e.g., after some period of time).

Thus, in response to the number of probes/association requests being below a certain minimum threshold value, the gateway device 2 (or a wireless extender 3, a wireless AP, or the like) will automatically switch to broadcasting the 5 GHz SSID on a channel that is considered more "popular" with client devices 4 in the LAN. With the above-described configuration, the gateway device 2 (or a wireless extender 3, a wireless AP, or the like) according to some example embodiments of inventive concepts disclosed therein can significantly reduce the possibility of not getting the 5 GHz SSID on the client devices 4 (e.g., customer smartphones, etc.). Further, the smart channel selection function described above also enables the gateway device 2 (or a wireless extender 3, a wireless AP, or the like) to receive Non-associated client station probes in a Multi-AP/HNC environment, thus enhancing steering choices.

FIG. 8A is a chart illustrating an example memory structure of the electronic apparatus according to some example embodiments, including stored data associated with the monitoring of the LAN and performing of the smart channel selection function, with the commonly used 20/40/80 MHz wide channels shown together. FIG. 8B is a chart illustrating an example memory structure of the electronic apparatus according to some example embodiments, with the commonly used 20/40/80 MHz wide channels shown separately.

In FIG. 8A, various data relating to the monitoring of the LAN may be stored by, for example, the gateway device 2. The data may be stored in a tabular form in the memory of the gateway device 2. For example, a channel table 300 may include various fields listing the available channels in the 5 GHz frequency band (e.g., including but not limited to U-NII-1 channels 32-48 (lower range) and U-NII-3 channels 149-165 (upper range), although some other example embodiments could make use of the U-NII-2 channels (intermediate range DFS channels)), the number of client devices that connect to the LAN, the number of client probes/association requests received on each channel, and a quality indicator (e.g., in the form of a score, ranking, or the like). The gateway device 2 refers to the data stored in the channel table 300 when performing the smart channel selection function. For example, the gateway device 2 may determine whether the current channel (the first channel) has a number of probes/association requests that is greater than or equal to a minimum threshold number of probes/association requests. If the current channel has a number of probes/association requests that is less than the threshold number, the gateway device 2 may identify a subset of the available 5 GHz channels that do in fact have more than the minimum threshold number of probes/association requests associated therewith in the channel table 300, and select the channel having the highest quality indicator from among the identified subset of channels.

FIG. 8B illustrates various alternative embodiments of the channel table 300, which may be separated according to channel width (e.g., 20 MHz wide channels, 40 MHz wide channels, 80 MHz wide channels). For example, certain exemplary gateway devices 2 may only use one or two of these three channel widths, depending on particular network deployments involved, such that performing monitoring and channel selection with respect to the channel numbers that are associated with the unused channel widths is unnecessary.

Using the data stored in the channel table 300 of FIGS. 8A and 8B, the gateway device 2 can effectively exclude from consideration during the smart channel selection procedure any "unpopular" channels that clients in the LAN do not probe frequently, by setting a minimum threshold number of probes/association requests, for example. Then, the gateway device 2 can select the cleanest channel (or next best quality channel) from among the remaining popular channels that are probed more often by the client devices in the LAN, to which the gateway device 2 moves the broadcasting of the 5 GHz SSID to establish connections with the client devices 4. Although the data is shown sorted in order of channel numbers in channel table 300, the data could also be sorted in order of the number of probes/association requests (e.g., highest # to lowest) and/or based on the quality indicator (e.g., highest score or ranking to lowest) according to various other example embodiments for implementing the smart channel selection function.

Figure 9:
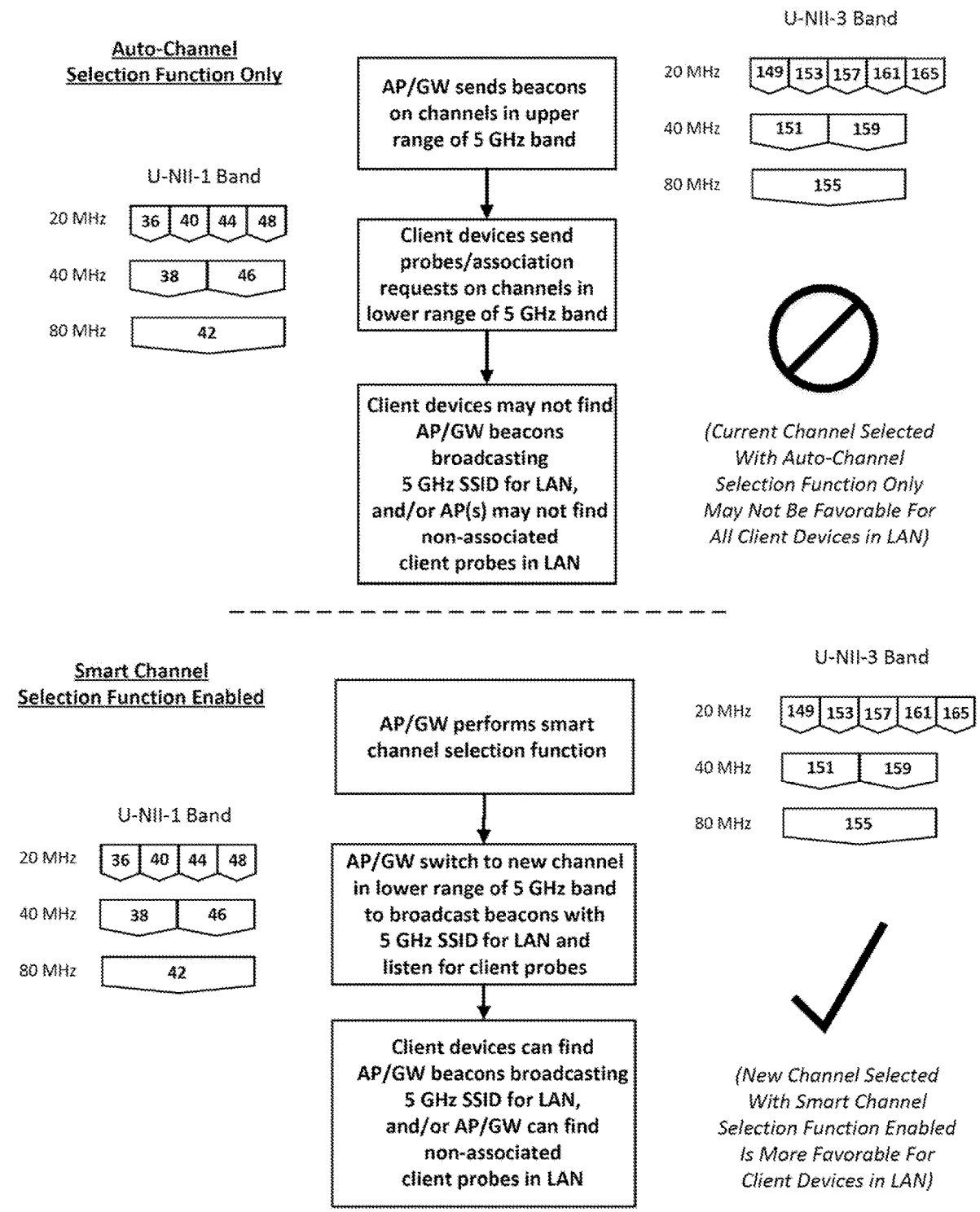
FIG. 9 is a conceptual diagram illustrating a problem in the related art including an auto-channel selection function only, and a solution including a smart channel selection function according to an embodiment of the present disclosure.

FIG. 9 is a conceptual diagram illustrating a problem in the related art including an auto-channel selection function only, and a solution including a smart channel selection function according to some example embodiments.

The top half of FIG. 9 illustrates a problem that can occur when a gateway device or access point (AP) is equipped with an auto-channel selection function only. The gateway device or AP sends beacons on channels in the upper range (e.g., U-NII-3 channels 149-165) of the 5 GHz band, while the client device actively sends probes/association requests (and/or passively listens for beacons) on channels in the lower range (e.g., U-NII-1 channels 32-36) of the 5 GHz band. As discussed above, gateway devices and/or APs may tend to prefer the higher channels (e.g., better "quality," greater Wi-Fi coverage range) while client devices may tend to prefer the lower channels (e.g., optimized scanning, lower power consumption), due to various different reasons. As a result, the client devices may not be able to find the gateway device or AP beacons that are broadcasting the 5 GHz SSID for the LAN, and/or the gateway device or AP may not be able to find Non-associated client probes in the LAN. Additionally or alternatively, network conditions may change over time (e.g., interference, congestion, etc.) after the gateway device or AP performs an auto-channel selection function at startup (or after disabling the auto-channel selection feature and instead setting a "fixed" channel, like in the known solution of the related art discussed above), such that the current channel (or the fixed channel of the known solution) is no longer the "best" (highest quality) channel. Thus, the current channel in the 5 GHz band that is selected by the gateway device or AP, based on the auto-channel selection function alone (and/or based on setting the fixed channel), may not be favorable (or may not remain favorable) for all client devices in the LAN to detect and connect.

The bottom half of FIG. 9 illustrates a solution to the above-described problem by implementing a smart channel selection function. When the gateway device or AP performs the smart channel selection function (as described above with reference to FIGS. 6-8), the gateway device or AP moves to a new channel in the lower range (e.g., U-NII-1 channels 32-48) of the 5 GHz band, and begins to broadcast beacons with the 5 GHz SSID for the LAN and listen for client probes on the new channel. As a result, the client devices can now find the gateway device or AP beacons broadcasting the 5 GHz SSID, and/or the gateway device or AP can find Non-associated client probes in the LAN. Thus, the new channel in the lower range of the 5 GHz band that is selected by the gateway device or AP, based on having the smart channel selection function enabled according to some example embodiments disclosed herein, may be more favorable for all or most client devices in the LAN to detect and connect (e.g., as compared to the previous channel in the upper range of the 5 GHz band that was selected based on the auto-channel selection function). In this manner, by moving from the higher range of channels (U-NII-3) to the lower range of channels (U-NII-1), the smart channel selection function can achieve better performance for some or all client devices in the LAN (e.g., such as clients operating according to IEEE 802.11 A/N/AC wireless communication standards).

As discussed above in connection with FIGS. 6-9, the gateway device 2 may automatically move from an unfavorable channel (e.g., a channel in the upper U-NII-3 range) to a more "popular" channel (e.g., a channel in the lower U-NII-1 range) to operate, as a result of performing the smart channel selection function. Alternatively, there may be instances where the gateway device 2 starts operating on a channel in the lower U-NII-1 range (e.g., as a result of the auto-channel selection function), instead of a channel in the upper U-NII-3 range. However, if no client devices 4 detect the 5 GHz SSID and connect at the lower channel range (e.g., channels 32-48), the gateway device 2 may then move to a higher channel (e.g., channels 149-165) and operate in either case. In such instances, there is a possibility that a client device 4 (e.g., a smartphone) may still miss the 5 GHz SSID of the gateway device 2.

According to a modification of the above-described example embodiments of inventive concepts disclosed herein, a mobile application (app) may be programmed to provide a "Find My Phone" feature to solve this problem. For example, the client device 4 (e.g., smartphone) may store the mobile app in its memory and its processor may execute the mobile app to make the client device 4 list the 5 GHz SSID once the client device 4 and the gateway device 2 establish a connection over a 2.4 GHz channel via their 2.4 GHz radios. When this Find My Phone feature is activated, a gateway device 2 that is operating on an unfavorable 5 GHz channel will move down to a more popular 5 GHz channel to send beacons and listen for client probes. Then, the client device 4 will list the 5 GHz SSID of the gateway device 2 once connected.

In some example embodiments, this modification may include a series of steps that are performed after step S170 in FIG. 6 and step S270 in FIG. 7, and before step S280 in FIG. 7. For example, the gateway device 2 determines whether any client devices connect on one of the current channel (the first channel) or the new channel (the second channel) in the 5 GHz radio frequency band. In response to no client devices connecting on the current channel or the new channel in the 5 GHz radio frequency band, the gateway device 2 may then establish a connection with a client device 4 on an available channel in the 2.4 GHz radio frequency band, and notify the client device to find the 5 GHz SSID of the gateway device 2 on the current channel or the new channel in the 5 GHz radio frequency band. For example, the gateway device 2 may send a message to the client device 4 that is executing the mobile app, where the message includes the 5 GHz SSID/channel, and the mobile app enables the client device 4 to latch onto the 5 GHz SSID of the gateway device 2 and establish the 5 GHz Wi-Fi connection.

Alternatively, or if the above procedure fails, the gateway device 2 will move to a common channel in the lower range of channels (e.g., channels 32-48), which will make the client device 4 move to that common channel. However, if this alternative example embodiment fails, the above procedure can be attempted again in order to move the client device 4 to the channel on which the gateway device 2 is operating to broadcast the 5 GHz SSID, using the mobile app. Thus, in some example embodiments, the Find My Phone feature that is provided via a mobile application can serve as a backup or failsafe, in certain instances where the smart channel selection feature does not successfully result in the client device 4 being able to detect the 5 GHz SSID and connect with the gateway device 2 via the 5 GHz channel. However, in some other example embodiments, the Find My Phone feature could be attempted first, and the smart channel selection function could serve as the backup or failsafe in case it does not work.

According to some example embodiments of inventive concepts disclosed herein, there are provided novel solutions for enabling a network gateway device and/or a wireless AP to operate on the "best" available channel (e.g., optimal, ideal, fastest, least congested, lowest interference, etc.) from among channels that are also considered "popular" with client devices in the WLAN environment. In addition, there is provided a "Find My Phone" feature on an application (e.g., a mobile app) associated with the gateway device and/or AP that may be provided by the Multiple System Operator (MSO) or Internet Service Provider (ISP), and which can make client devices (e.g., smartphones) list or "find" the 5 GHz SSID of the AP. The novel solutions according to example embodiments of inventive concepts disclosed herein provide features that enhance SSID availability with a "Smart Channel Selection" function, and which may be incorporated into home/residential network gateway (GW) devices, wireless access points (Wi-Fi APs), Home Network Controller (HNC) devices, wireless routers, mesh networking nodes (e.g., Wi-Fi EasyMesh systems), and the like.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. An electronic apparatus for smart channel selection, the electronic apparatus comprising:
   a memory storing computer-readable instructions;
   a processor configured to execute the computer-readable instructions to:
      track client devices that connect with a local area network (LAN) of the electronic apparatus over time;
      store a historical number of client devices that connect with the LAN, and a channel number on which the electronic apparatus operated each connection with the client devices;
      monitor a number of probes/association requests on channels in a 5 GHz radio frequency band that are available to broadcast a 5 GHz service set identifier (SSID) of the electronic apparatus;
      determine whether the number of probes/association requests on a current channel in the 5 GHz radio frequency band on which the electronic apparatus is operating is less than a predefined threshold value; and
      in response to the number of probes/association requests on the current channel being less than the predefined threshold value:
         perform a smart channel selection function to select a new channel in the 5 GHz radio frequency band having a number of probes/association requests that is greater than or equal to the predefined threshold value; and
         broadcast the 5 GHz SSID of the electronic apparatus on the new channel that is selected based on the smart channel selection function.

2. The electronic apparatus of claim 1, wherein the processor is further configured to execute the computer-readable instructions to:
   generate a list of channels in the 5 GHz radio frequency band that are available for Wi-Fi use, wherein the list of channels includes a lower range of channels and an upper range of channels.

3. The electronic apparatus of claim 2, wherein the processor is further configured to execute the computer-readable instructions to:
   perform an auto-channel selection function at startup of the electronic apparatus to select a first channel from the list of channels, the first channel having a best quality among channels in the list of channels based on any of signal strength, noise, interference, channel utilization, or a combination thereof; and
   broadcast the 5 GHz SSID on the current channel, wherein the current channel is the first channel that is selected based on the auto-channel selection function.

4. The electronic apparatus of claim 2, wherein:
   the lower range of channels includes U-NII-1 channels in the range of 5.15 GHz to 5.25 GHz, including: channels 32, 36, 40, 44, and 48 in a case of the electronic apparatus operating with 20 MHz wide channels, channels 38 and 46 in a case of the electronic apparatus operating with 40 MHz channels, and channel 42 in a case of the electronic apparatus operating with 80 MHz channels; and
   the upper range of channels includes U-NII-3 channels in the range of 5.725 GHz to 5.85 GHz, including: channels 149, 153, 157, 161, and 165 in the case of the electronic apparatus operating with 20 MHz wide channels, channels 151 and 159 in the case of the electronic apparatus operating with 40 MHz wide channels, and channel 155 in the case of the electronic apparatus operating with 80 MHz wide channels.

5. The electronic apparatus of claim 4, wherein:
   the lower range of channels further includes U-NII-2A channels in the range of 5.25 GHz to 5.35 GHz, which are subject to dynamic frequency selection (DFS), including: channels 52, 56, 60, 64, and 68 in the case of 20 MHz wide channels, channels 54 and 62 in the case of 40 MHz wide channels, and channel 58 in the case of 80 MHz wide channels; and
   the upper range of channels further includes U-NII-2C channels in the range of 5.47 GHz to 5.725 GHz, which are subject to dynamic frequency selection (DFS), including: channels 96, 100, 104, 108, 112, 116, 120, 124, 128, 132, 136, 140, and 144 in the case of 20 MHz wide channels, channels 102, 110, 118, 126, 134, and 142 in the case of 40 MHz wide channels, and channel 114 in the case of 80 MHz wide channels.

6. The electronic apparatus of claim 4, wherein the list of channels excludes an intermediate range of channels in the 5 GHz radio frequency band that are subject to dynamic frequency selection (DFS), wherein the intermediate range of channels includes U-NII-2 channels in the range of 5.25 GHz to 5.725 GHz.

7. The electronic apparatus of claim 4, wherein:
   the current channel that is selected from the list of channels based on the auto-channel selection function is a channel in the upper range of channels in the 5 GHz radio frequency band; and
   the new channel that is selected from the list of channels based on the smart channel selection function is a channel in the lower range of channels in the 5 GHz radio frequency band, wherein the new channel is a channel having a best quality among channels in the list of channels having a number of probes/association requests that is greater than the predefined threshold value.

8. The electronic apparatus of claim 1, wherein the processor is further configured to execute the computer-readable instructions to:
   establish a connection with one or more client devices that detect the 5 GHz SSID of the electronic apparatus on the new channel in the LAN.

9. The electronic apparatus of claim 1, wherein the processor is further configured to execute the computer-readable instructions to:
   determine whether any client devices connect on one of the current channel or the new channel in the 5 GHz radio frequency band; and
   in response to no client devices connecting on the current channel or the new channel in the 5 GHz radio frequency band:
      establish a connection with a client device on an available channel in a 2.4 GHz radio frequency band; and
      notify the client device to find the 5 GHz SSID of the electronic apparatus on the current channel or the new channel in the 5 GHz radio frequency band.

10. A method for smart channel selection, the method comprising:
   tracking client devices that connect with a local area network (LAN) associated with a gateway device over time;
   storing a historical number of client devices that connect with the LAN, and a channel number on which the gateway device operated each connection with the client devices;
   monitoring a number of probes/association requests on channels in a 5 GHz radio frequency band that are available to broadcast a 5 GHz service set identifier (SSID) of the gateway device;
   determining whether the number of probes/association requests on a current channel in the 5 GHz radio frequency band on which the gateway device is operating is less than a predefined threshold value; and
   in response to the number of probes/association requests on the current channel being less than the predefined threshold value:
      performing a smart channel selection function to select a new channel in the 5 GHz radio frequency band having a number of probes/association requests that is greater than or equal to the predefined threshold value; and
      broadcasting the 5 GHz SSID of the gateway device on the new channel that is selected based on the smart channel selection function.

11. The method of claim 10, further comprising:
   generating a list of channels in the 5 GHz radio frequency band that are available for Wi-Fi use, wherein the list of channels includes a lower range of channels and an upper range of channels.

12. The method of claim 11, further comprising:
   performing an auto-channel selection function at startup of the gateway device to select a first channel from the list of channels, the first channel having a best quality among channels in the list of channels based on any of signal strength, noise, interference, channel utilization, or a combination thereof; and
   broadcasting the 5 GHz SSID on the current channel, wherein the current channel is the first channel that is selected based on the auto-channel selection function.

13. The method of claim 11, wherein:
   the lower range of channels includes U-NII-1 channels in the range of 5.15 GHz to 5.25 GHz, including: channels 32, 36, 40, 44, and 48 in a case of the gateway device operating with 20 MHz wide channels, channels 38 and 46 in a case of the gateway device operating with 40 MHz channels, and channel 42 in a case of the gateway device operating with 80 MHz channels; and
   the upper range of channels includes U-NII-3 channels in the range of 5.725 GHz to 5.85 GHz, including: channels 149, 153, 157, 161, and 165 in the case of the gateway device operating with 20 MHz wide channels, channels 151 and 159 in the case of the gateway device operating with 40 MHz wide channels, and channel 155 in the case of the gateway device operating with 80 MHz wide channels.

14. The method of claim 13, wherein:
   the lower range of channels further includes U-NII-2A channels in the range of 5.25 GHz to 5.35 GHz, which are subject to dynamic frequency selection (DFS), including: channels 52, 56, 60, 64, and 68 in the case of 20 MHz wide channels, channels 54 and 62 in the case of 40 MHz wide channels, and channel 58 in the case of 80 MHz wide channels; and
   the upper range of channels further includes U-NII-2C channels in the range of 5.47 GHz to 5.725 GHz, which are subject to dynamic frequency selection (DFS), including: channels 96, 100, 104, 108, 112, 116, 120, 124, 128, 132, 136, 140, and 144 in the case of 20 MHz wide channels, channels 102, 110, 118, 126, 134, and 142 in the case of 40 MHz wide channels, and channel 114 in the case of 80 MHz wide channels.

15. The method of claim 14, wherein:
   the current channel that is selected from the list of channels based on the auto-channel selection function is a channel in the upper range of channels in the 5 GHz radio frequency band; and
   the new channel that is selected from the list of channels based on the smart channel selection function is a channel in the lower range of channels in the 5 GHz radio frequency band, wherein the new channel is a channel having a best quality among channels in the list of channels having a number of probes/association requests that is greater than the predefined threshold value.

16. The method of claim 13, wherein the list of channels excludes an intermediate range of channels in the 5 GHz radio frequency band that are subject to dynamic frequency selection (DFS), wherein the intermediate range of channels includes U-NII-2 channels in the range of 5.25 GHz to 5.725 GHz.

17. The method of claim 11, further comprising:
   determining whether any client devices connect on one of the current channel or the new channel in the 5 GHz radio frequency band; and
   in response to no client devices connecting on the current channel or the new channel in the 5 GHz radio frequency band:
      establish a connection with a client device on an available channel in a 2.4 GHz radio frequency band; and
      notify the client device to find the 5 GHz S SID of the gateway device on the current channel or the new channel in the 5 GHz radio frequency band.

18. The method of claim 10, further comprising:
   establishing a connection with one or more client devices that detect the 5 GHz SSID of the gateway device on the new channel in the LAN.

19. A non-transitory computer-readable medium storing a program for smart channel selection, which when executed by a processor of an electronic apparatus, cause the electronic apparatus to perform operations comprising:
   tracking client devices that connect with a local area network (LAN) associated with the electronic apparatus over time;

storing a historical number of client devices that connect with the LAN, and a channel number on which the electronic apparatus operated each connection with the client devices;

monitoring a number of probes/association requests on channels in a 5 GHz radio frequency band that are available to broadcast a 5 GHz service set identifier (SSID) of the electronic apparatus;

determining whether the number of probes/association requests on a current channel in the 5 GHz radio frequency band on which the electronic apparatus is operating is less than a predefined threshold value; and in response to the number of probes/association requests on the current channel being less than the predefined threshold value:

performing a smart channel selection function to select a new channel in the 5 GHz radio frequency band having a number of probes/association requests that is greater than or equal to the predefined threshold value; and broadcasting the 5 GHz SSID of the electronic apparatus on the new channel that is selected based on the smart channel selection function.

20. The computer-readable medium of claim 19, wherein the program, when executed by the processor, further cause the electronic apparatus to perform operations comprising:

generating a list of channels in the 5 GHz radio frequency band that are available for Wi-Fi use, wherein the list of channels includes a lower range of channels and an upper range of channels;

performing an auto-channel selection function at startup of the electronic apparatus to select a first channel from the list of channels, the first channel having a best quality among channels in the list of channels based on any of signal strength, noise, interference, channel utilization, or a combination thereof;

broadcasting the 5 GHz SSID on the current channel, wherein the current channel is the first channel that is selected from the list of channels based on the auto-channel selection function and is a channel in the upper range of channels in the 5 GHz radio frequency band; and in response to broadcasting the 5 GHz SSID of the electronic apparatus on the new channel that is selected from the list of channels based on the smart channel selection function, establishing a connection with one or more client devices that detect the 5 GHz SSID of the electronic apparatus on the new channel in the LAN, wherein the new channel is a channel in the lower range of channels in the 5 GHz radio frequency band having a best quality among channels in the list of channels having a number of probes/association requests that is greater than the predefined threshold value.

* * * * *